(12) United States Patent
Patel et al.

(10) Patent No.: US 7,211,984 B2
(45) Date of Patent: May 1, 2007

(54) START-UP AND RESTART OF INTERIOR PERMANENT MAGNET MACHINES

(75) Inventors: Nitinkumar R. Patel, Cypress, CA (US); Steven E. Schulz, Torrance, CA (US); Thomas P. O'Meara, Redondo Beach, CA (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/984,269

(22) Filed: Nov. 9, 2004

(65) Prior Publication Data
US 2006/0097688 A1 May 11, 2006

(51) Int. Cl.
*H02P 21/14* (2006.01)

(52) U.S. Cl. .............. 318/778; 318/700; 318/707; 318/711; 318/715; 318/720; 318/721; 318/722; 318/727; 318/807

(58) Field of Classification Search .......... 318/700, 318/727, 807
See application file for complete search history.

(56) References Cited

U.S. PATENT DOCUMENTS

| | | | | | |
|---|---|---|---|---|---|
| 4,649,331 | A | * | 3/1987 | Jahns | 318/798 |
| 4,814,677 | A | * | 3/1989 | Plunkett | 318/254 |
| 5,144,564 | A | * | 9/1992 | Naidu et al. | 318/721 |
| 5,481,166 | A | * | 1/1996 | Moreira | 318/254 |
| 5,585,709 | A | * | 12/1996 | Jansen et al. | 318/807 |
| 5,635,810 | A | * | 6/1997 | Goel | 318/719 |
| 5,701,066 | A | * | 12/1997 | Matsuura et al. | 318/808 |
| 5,717,305 | A | * | 2/1998 | Seibel et al. | 318/778 |
| 5,818,192 | A | * | 10/1998 | Nozari | 318/609 |
| 5,867,004 | A | * | 2/1999 | Drager et al. | 318/701 |
| 6,005,783 | A | * | 12/1999 | Xue et al. | 363/36 |
| 6,008,618 | A | * | 12/1999 | Bose et al. | 318/811 |
| 6,014,007 | A | | 1/2000 | Seibel et al. | 318/805 |
| 6,018,225 | A | * | 1/2000 | Garces | 318/798 |
| 6,069,467 | A | * | 5/2000 | Jansen | 318/802 |
| 6,137,258 | A | * | 10/2000 | Jansen | 318/802 |
| 6,163,127 | A | * | 12/2000 | Patel et al. | 318/700 |
| 6,396,229 | B1 | * | 5/2002 | Sakamoto et al. | 318/439 |
| 6,462,492 | B1 | * | 10/2002 | Sakamoto et al. | 318/254 |
| 6,492,788 | B1 | * | 12/2002 | Agirman et al. | 318/700 |
| 6,501,243 | B1 | * | 12/2002 | Kaneko et al. | 318/700 |
| 6,531,843 | B2 | * | 3/2003 | Iwaji et al. | 318/727 |
| 6,552,509 | B2 | * | 4/2003 | Veltman | 318/807 |
| 6,567,282 | B1 | * | 5/2003 | Kikuchi et al. | 363/37 |
| 6,577,096 | B2 | * | 6/2003 | Cho | 318/727 |
| 6,639,380 | B2 | * | 10/2003 | Sul et al. | 318/727 |
| 6,696,812 | B2 | * | 2/2004 | Kaneko et al. | 318/700 |
| 6,741,060 | B2 | * | 5/2004 | Krefta et al. | 318/727 |
| 6,756,753 | B1 | * | 6/2004 | Marcinkiewicz | 318/254 |
| 6,763,622 | B2 | * | 7/2004 | Schulz et al. | 318/700 |
| 6,788,024 | B2 | * | 9/2004 | Kaneko et al. | 318/807 |
| 6,822,418 | B2 | * | 11/2004 | Harke | 318/807 |
| 6,831,440 | B1 | * | 12/2004 | Royak et al. | 318/727 |
| 6,841,969 | B1 | * | 1/2005 | Schulz et al. | 318/807 |
| 6,894,454 | B2 | * | 5/2005 | Patel et al. | 318/700 |
| 6,924,617 | B2 | * | 8/2005 | Schulz et al. | 318/701 |
| 2001/0002784 | A1 | * | 6/2001 | Masaki et al. | 318/727 |
| 2002/0041171 | A1 | * | 4/2002 | Cho | 318/727 |

(Continued)

*Primary Examiner*—Lincoln Donovan
*Assistant Examiner*—Robert W. Horn
(74) *Attorney, Agent, or Firm*—Christopher DeVries (57) ABSTRACT

A method of starting a permanent magnet machine. A machine stator voltage in a stationary reference frame is sensed. An initial speed of a rotor of the machine is estimated based on the sensed voltage, and state variables of control algorithms are initialized based on the estimated initial speed. This method can provide smooth startup and/or restart at any speed.

7 Claims, 9 Drawing Sheets

U.S. PATENT DOCUMENTS

| | | |
|---|---|---|
| 2002/0060546 A1* | 5/2002 | Veltman ..................... 318/700 |
| 2002/0163319 A1* | 11/2002 | Kaneko et al. ............. 318/727 |
| 2003/0052561 A1 | 3/2003 | Rahman et al. |
| 2003/0062870 A1* | 4/2003 | Royak et al. ............... 318/727 |
| 2003/0160583 A1* | 8/2003 | Patel ......................... 318/254 |
| 2003/0164655 A1 | 9/2003 | Biais et al. |
| 2003/0173852 A1 | 9/2003 | Biais et al. |
| 2003/0209950 A1 | 11/2003 | Biais et al. |
| 2003/0233200 A1* | 12/2003 | Petrovic et al. .............. 702/57 |
| 2004/0051495 A1* | 3/2004 | Kaneko et al. ............. 318/807 |
| 2004/0070360 A1* | 4/2004 | Schulz et al. ............... 318/700 |
| 2004/0070362 A1 | 4/2004 | Patel et al. ................. 318/701 |
| 2004/0232862 A1* | 11/2004 | Wogari et al. .............. 318/254 |
| 2005/0024009 A1* | 2/2005 | Kinpara et al. ............. 318/700 |
| 2005/0110452 A1* | 5/2005 | Toyozawa et al. .......... 318/807 |
| 2005/0146306 A1* | 7/2005 | Ha et al. .................... 318/807 |
| 2005/0151502 A1* | 7/2005 | Quirion ...................... 318/715 |
| 2005/0151504 A1* | 7/2005 | Kimura et al. .............. 318/807 |
| 2005/0253545 A1* | 11/2005 | Dornhof ..................... 318/434 |
| 2006/0097688 A1* | 5/2006 | Patel et al. ................. 318/778 |

* cited by examiner

START-UP AND RESTART OF INTERIOR PERMANENT MAGNET MACHINES

CROSS-REFERENCE TO RELATED APPLICATIONS

This application is related to U.S. patent application Ser. No. 10/984178, filed Nov. 9, 2004, entitled, "Position-Sensorless Control Of Interior Permanent Magnet Machines". The disclosure of the above application is incorporated herein by reference.

FIELD OF THE INVENTION

The present invention relates generally to interior permanent magnet (IPM) machines and, more particularly, to start-up and restart of IPM machines.

BACKGROUND OF THE INVENTION

Interior permanent magnet machines are used in many different applications, including but not limited to vehicle applications. For example, IPM machines may be used in vehicle alternator-starter systems to provide engine cranking for engine starts and to generate power for vehicle electrical loads. In some vehicles, energy is saved and emissions are reduced by "on-and-off" operation, that is, by turning the engine on and off based on emission and gas consumption levels. Such engines may need repeated starting, for example, during urban stop-and-go operation.

A number of circumstances can affect the performance of an IPM machine during restart, not only in vehicle applications but also in other applications. For example, a fault in a processor controlling an IPM machine could cause the machine to lose synchronization. It is desirable for IPM machines to start up and restart smoothly in such situations.

SUMMARY OF THE INVENTION

The present invention, in one embodiment, is directed to a method of starting a permanent magnet machine controlled using one or more position detection modules that detect a position of a rotor of the machine. A machine stator voltage in a stationary reference frame is sensed. An initial speed of a rotor of the machine is estimated based on the sensed voltage. At least one of the one or more position detection modules is initialized based on the estimated initial speed.

In another configuration, a method of starting an IPM machine includes providing power to the machine and sensing one or more stator voltages. An initial speed and position of a rotor of the machine are estimated using the one or more sensed voltages while regulation of current to the machine is disabled. Current regulation is initiated based on the estimated initial rotor speed and position while a torque command to the machine is disabled.

In yet another embodiment, a drive system includes an interior permanent magnet (IPM) machine having a rotor and a stator. A controller includes one or more current regulators that regulate current commands to the machine, a gate driver that switches a signal to the stator, and one or more position detection modules that detect positioning of the rotor. The controller measures d- and q-axis stator voltages in a stationary reference frame, estimates an initial velocity of the rotor based on the measured voltages, and initializes at least one of the one or more position detection modules based on the estimated initial velocity.

Further areas of applicability of the present invention will become apparent from the detailed description provided hereinafter. It should be understood that the detailed description and specific examples, while indicating exemplary embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF EXEMPLARY EMBODIMENTS

The following description of various embodiments of the present invention is merely exemplary in nature and is in no way intended to limit the invention, its application, or uses. For purposes of clarity, the same reference numbers will be used in the drawings to identify similar elements. As used herein, the term module and/or device refers to an application specific integrated circuit (ASIC), an electronic circuit, a processor (shared, dedicated, or group) and memory that execute one or more software or firmware programs, a combinational logic circuit, or other suitable components that provide the described functionality.

Generally, in connection with starting and/or restarting an IPM machine, it is desirable to initialize synchronous current regulators and state of observers used to estimate rotor position in such a manner as to avoid torque pulsation. Proper initialization of current regulators is particularly desirable at high speeds, when the back EMF of the machine is very high.

Accordingly, the present invention, in one configuration, is directed to a controller that controls an IPM machine during start up and/or restart during machine operation. As further described below, the controller uses measured voltages in a stationary reference frame to estimate an initial angular rotor velocity. Based on the estimated rotor velocity, the controller monitors an initialization process for appropriate machine states at start-up and also at restart, for example, upon an occurrence of a processor fault and reset.

As further described below, embodiments of the present invention may be implemented using hardware, software and/or firmware. One or more embodiments of the present invention are described herein with reference to a position-sensorless control system for an IPM machine, further described in U.S. Patent Application entitled "Position-Sensorless Control of Interior Permanent Magnet Machines", the disclosure of which is incorporated herein by reference in its entirety. The foregoing application was filed on the same date, and assigned to the same assignee, as the present application. Configurations of the present invention also are contemplated, however, in connection with other position-sensorless systems.

Furthermore, it should be understood that the present invention also can be implemented in connection with position-sensor-based drive systems. Additionally, although configurations of the present invention are described with reference to an alternator-starter system for an engine-powered vehicle, the invention is not so limited. Embodiments of the invention are contemplated for use in connection with permanent magnet machines in many other and additional applications.

Figure 1:
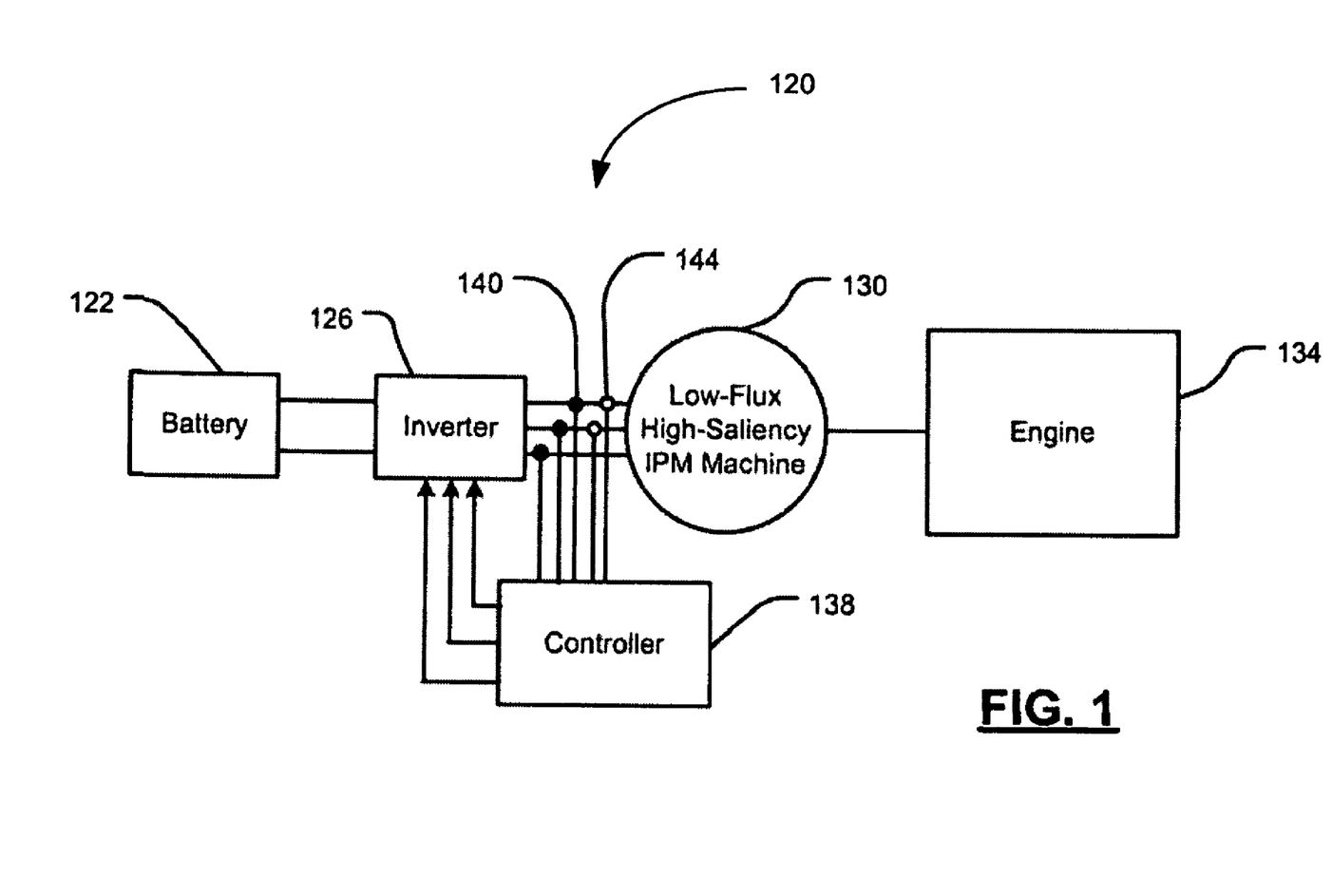
FIG. 1 is a diagram of an alternator-starter system for an engine-powered vehicle according to one embodiment of the present invention.

Referring now to FIG. 1, an embodiment of an alternator-starter system for an engine-powered vehicle is indicated generally by reference number 120. The system 120 may be used, for example, in an electric vehicle or a hybrid electric vehicle. A battery 122 is, for example, a 42-volt battery connected to an inverter 126. The inverter 126 converts direct voltage of the battery 122 to an alternating voltage for input to a machine 130. The machine 130 provides starting torque for cranking an engine 134 and also provides generation power for vehicle electrical loads. The machine 130 is, for example, an IPM machine that exhibits low flux and high saliency as further described below. A controller 138, including one or more processors (not shown), provides control for the machine 130 and the system 120. As further described below, the controller 138 uses voltages and currents measured via voltage sensing 140 and current sensing 144 to estimate a rotor position of the machine 130.

Figure 2:
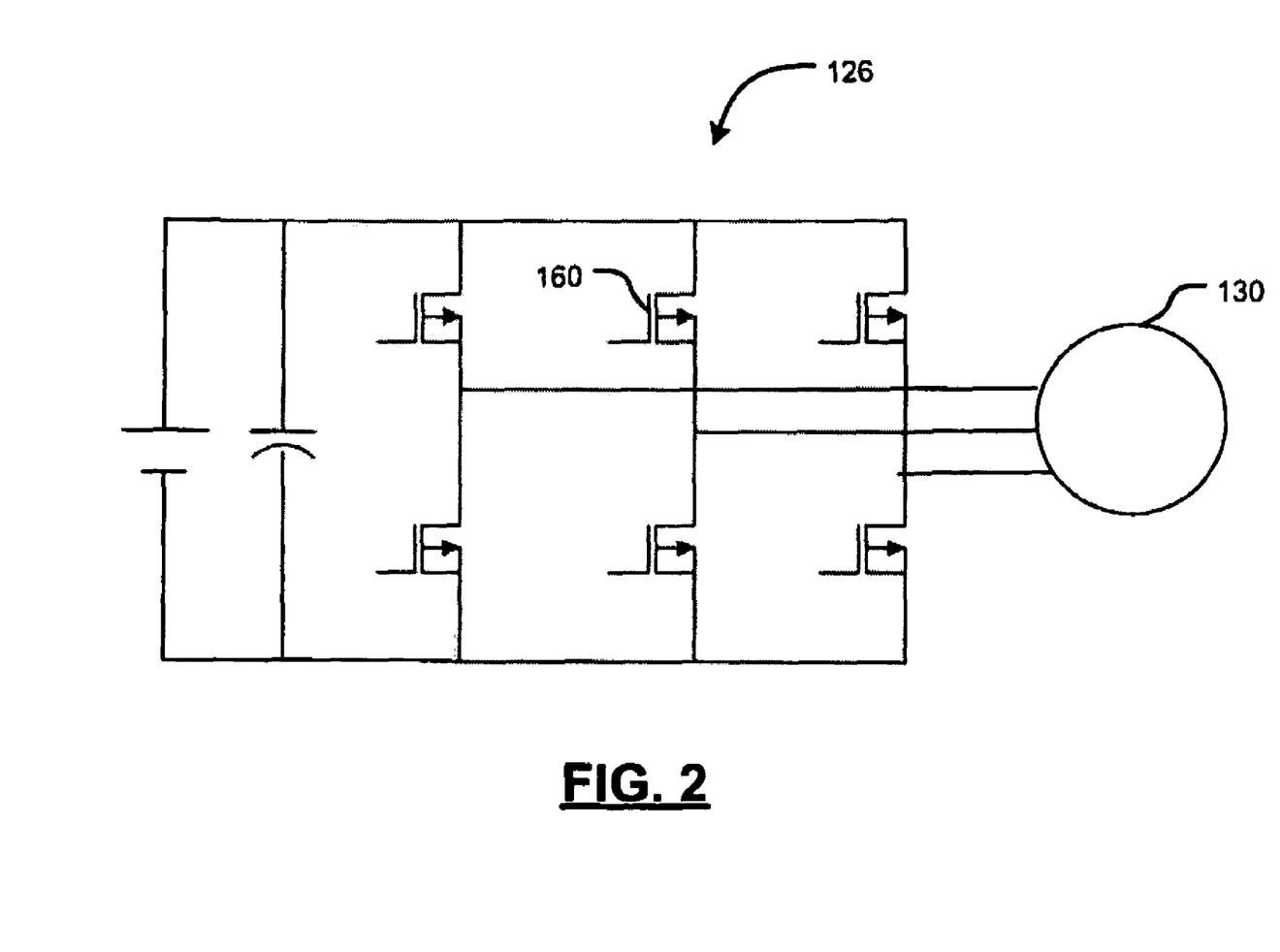
FIG. 2 is a diagram of the inverter and machine of the alternator-starter system shown in FIG. 1.

The inverter 126 is shown in greater detail in FIG. 2. The inverter 126 includes, for example, six MOSFET switches 160 in a Hexpak module from International Rectifier Corporation of El Segundo, Calif. and associated gate drive circuitry (not shown).

Figure 3:
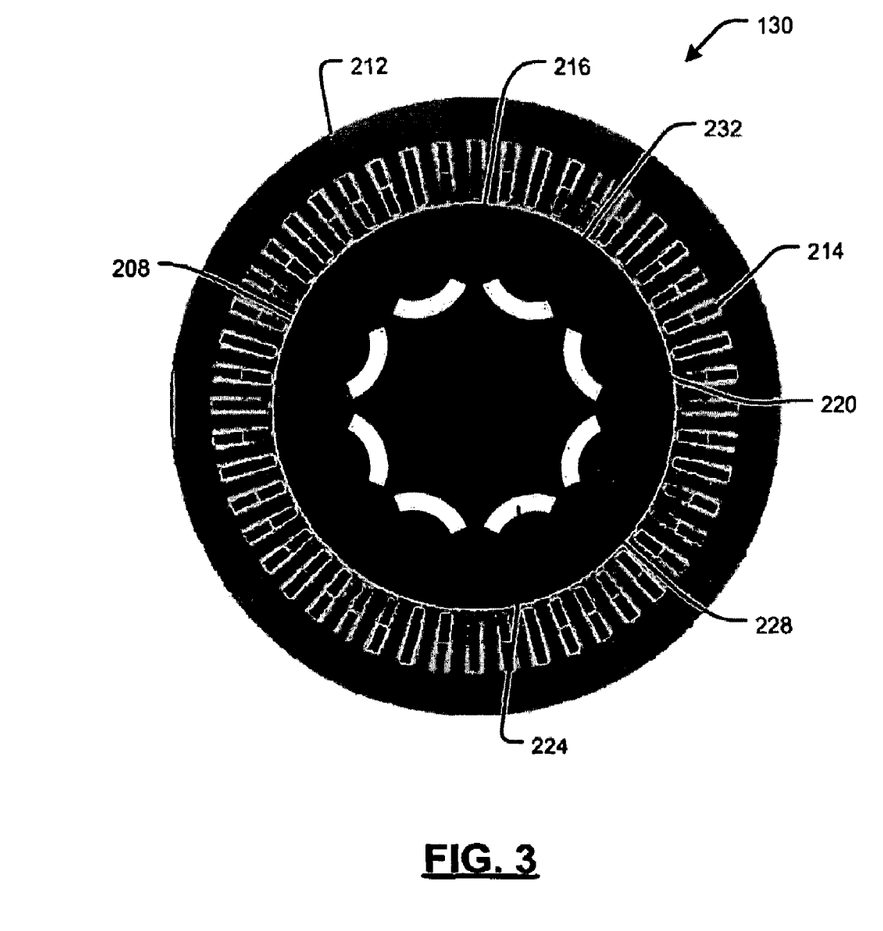
FIG. 3 is a cross-sectional view of an IPM machine in accordance with one embodiment of the present invention.

The machine 130 is shown in greater detail in FIG. 3. The machine 130 includes a rotor 208 and a stator 212 separated by an air gap 216. The stator 212 includes windings 214 and may be a short-pitched, distributed-winding stator the same as or similar to, for example, a stator used in an induction machine. The rotor 208 includes permanent magnets 220 inside slots or cavities 224 of the rotor 208. The magnets 220 are injection molded, although other types of magnets may be used.

The rotor slots 224 and magnets 220 are distributed in a plurality of barriers (also called layers) 228, for example, in three layers as shown in FIG. 3, to increase machine saliency. Generally, where machine saliency is high, magnetic flux in the air gap 216 can be kept weak. The rotor 208 is magnetized, for example, after the magnets 220 have been injected into the rotor 208. Reference is made to U.S. patent application Ser. No. 09/952,319 filed Sep. 14, 2001, U.S. patent application Ser. No. 10/140,918 filed May 7, 2002, U.S. patent application Ser. No. 10/087,236 filed Mar. 1, 2002, and U.S. patent application Ser. No. 10/431,744 filed May 8, 2003, assigned to the assignee of this application, and the disclosures of which are incorporated herein by reference in their entirety.

Shapes and placement of the barriers 228 are configured, for example, to maximize torque and minimize torque ripple. Additional information relating, for example, to magnetization and minimization of torque ripple in the machine 130 is available in the foregoing patent applications. Rotor cavities 224 which are sufficiently distant from an outer surface 232 of the rotor 208 such that magnetization of any magnetic material within them could be difficult or impossible are left empty of magnetic material. Magnetic flux in the air gap 216 is kept weak, to lower spin loss and reduce the possibility of faults.

Figure 4:
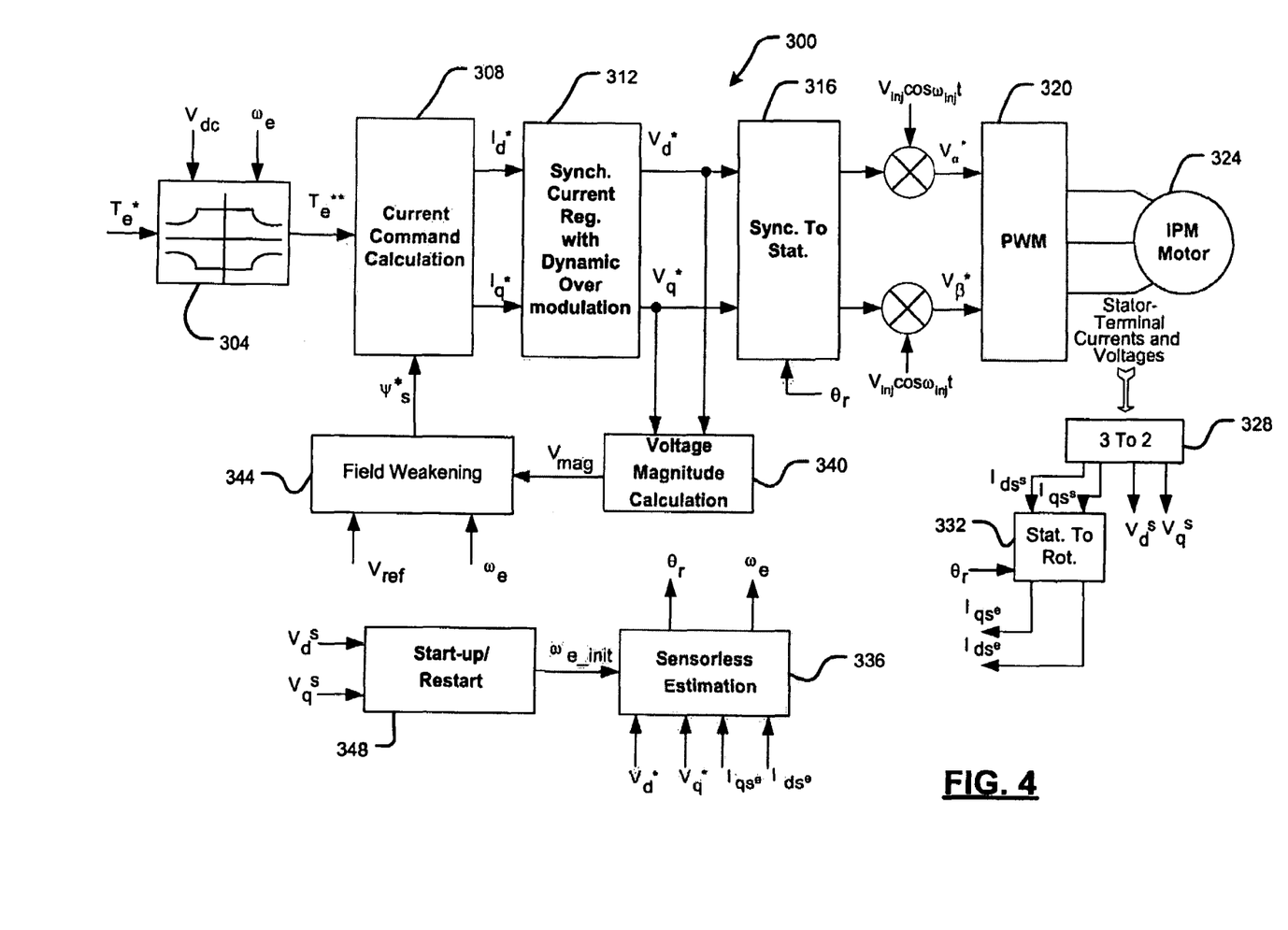
FIG. 4 is a diagram of an alternator-starter control system in accordance with one embodiment of the present invention.

An embodiment of an alternator-starter control system is indicated generally in FIG. 4 by reference number 300. A torque command $T_e^*$ is input to the control system 300 and is processed by a torque limiter module 304. The module 304 limits the torque command $T_e^*$ dependent on available DC link voltage $V_{dc}$ and estimated rotor angular velocity $\omega_e$. The angular velocity $\omega_e$ is estimated as further described below. The module 304 outputs a modified torque command $T_e^{}$. The modified torque command $T_e^{}$ and a stator flux command $\psi_s^*$, generated as further described below, are used as indices to a current command calculation module 308 to generate d- and q-axis stator current commands $I_d^*$ and $I_q^*$. The current command calculation module 308 generates efficiency-optimized control parameters for engine cranking and for generation operation.

The commands $I_d^*$ and $I_q^*$ are input to a synchronous current regulation and dynamic over-modulation module 312 to generate voltage commands $V_d^*$ and $V_q^*$ in the synchronous reference frame. A synchronous-to-stationary transformation module 316 vector-rotates the command voltages $V_d^*$ and $V_q^*$ using an estimated rotor angular position $\theta_r$. The rotor angular position $\theta_r$ can be estimated without using a position sensor, as further described below.

Stationary voltages output by the transformation module 316 are injected with a high-frequency injection signal, e.g., $V_{inj} \cos \omega_{inj} t$ wherein $\omega_{inj}$ is about 1 KHz, to produce stationary-frame command voltages $V_\alpha^*$ and $V_\beta^*$. The voltages $V_\alpha^*$ and $V_\beta^*$ are input to a pulse-width modulation (PWM) inverter 320, which applies alternating three-phase voltages to stator windings of a high-saliency, low-flux interior permanent magnet (IPM) machine 324 as previously discussed with reference to FIG. 3.

Stator terminal phase currents and phase voltages are measured, e.g., sensed as previously discussed with reference to FIG. 1 and processed by a three-phase-to-two-phase transformation module 328. The module 328 outputs stationary frame currents $I_{ds}^s$ and $I_{qs}^s$ and voltages $V_d^s$ and $V_q^s$. A stationary-to-rotating frame transformation module 332 uses the estimated rotor angular position $\theta_r$ to generate synchronous reference frame feedback currents $I_{ds}^e$ and $I_{qs}^e$. As further described below, a position-sensorless estimation module 336 uses the commanded d- and q-axis voltages $V_d^*$ and $V_q^*$, feedback currents $I_{ds}^e$ and $I_{qs}^e$, and an initial angular speed $\omega_{e\_init}$ to estimate rotor position $\theta_r$ and angular velocity $\omega_e$.

A voltage magnitude module 340 calculates magnitude $V_{mag}$ of the stator voltages from the commanded voltages $V_d^*$ and $V_q^*$. A field-weakening module 344 uses the stator voltage magnitude $V_{mag}$ and a predefined reference voltage $V_{ref}$ to generate the stator flux $\psi_s^*$. An embodiment of a startup/restart module 348, further described below, uses the measured stator terminal voltages $V_d^s$ and $V_q^s$ in the stationary reference frame and estimates an initial angular velocity $\omega_{e\_init}$. The module 348 also monitors other functions based on a speed of the motor 324, for example, at the instant of a processor fault occurrence, as further described below.

Figure 5:
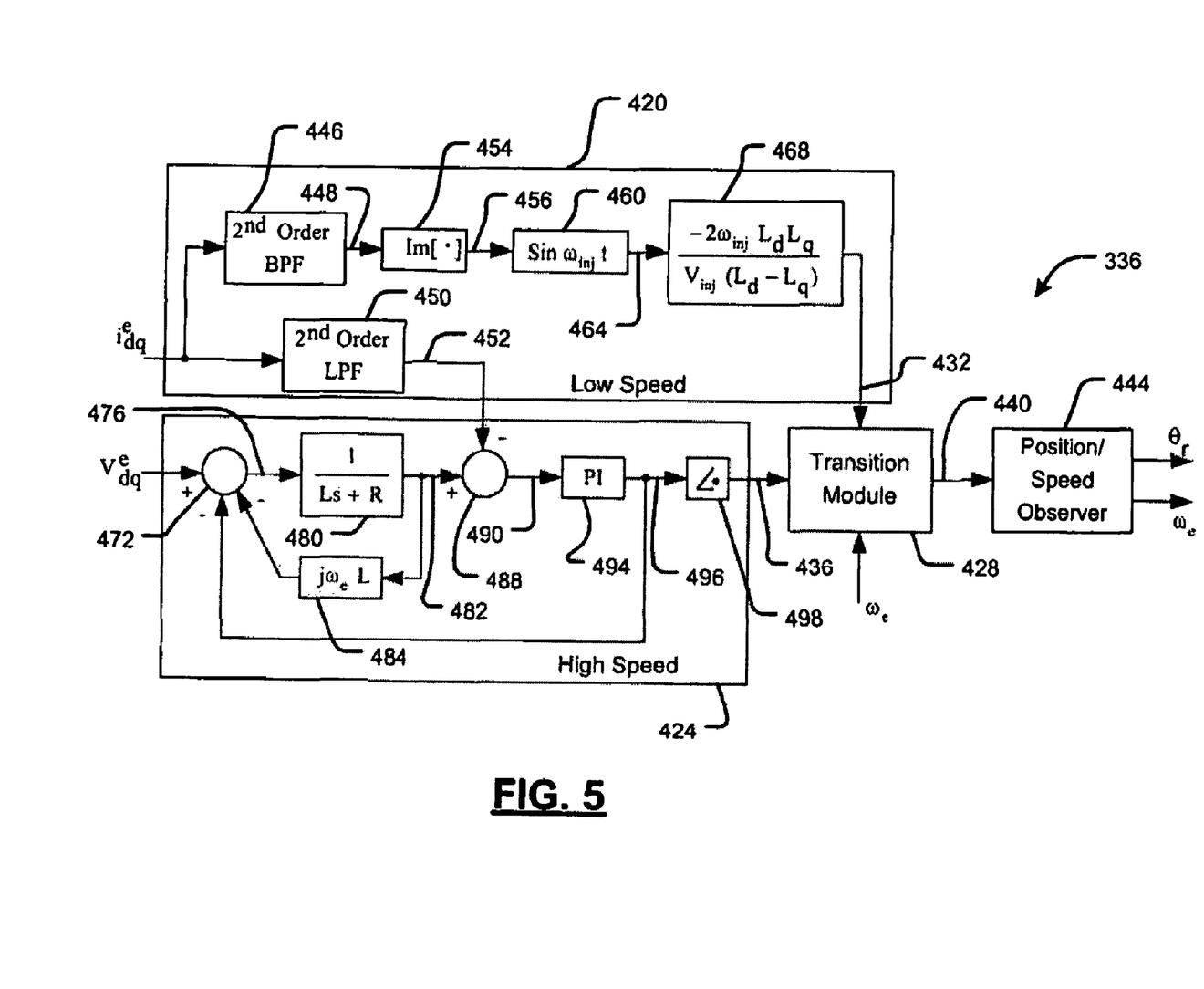
FIG. 5 is a diagram of a position detection module of an alternator-starter control system in accordance with one embodiment of the present invention.

The position-sensorless estimation module 336 is shown in greater detail in FIG. 5. The module 336 uses two methods to estimate rotor position and angular velocity from commanded voltages and feedback currents. Specifically, the module 336 includes a low-speed module 420 for estimating a rotor electrical position $\theta_r$ at zero and low speeds of machine operation. A high-speed module 424 is used for estimating rotor position at high speeds of machine operation. The modules 420 and 424 are further described below. A transition module 428 merges outputs 432 and 436 of the modules 420 and 424 as a function of rotor speed $\omega_e$, a value for which may be obtained as further described below, to generate a position error signal 440. A position/speed observer 444 uses the error signal 440 to estimate rotor position $\theta_r$ and angular velocity $\omega_e$.

More specifically, feedback currents $i_{qs}^e$ and $i_{ds}^e$ (shown in FIG. 5 as input current $i^e_{dq}$) and command voltages $V_d^*$ and $V_q^*$ (shown in FIG. 5 as input voltage $V^e_{dq}$) are input to the estimation module 336. In the low-speed module 420, input current $i^e_{dq}$ (in the synchronous reference frame) is processed through a second-order band-pass filter 446 to produce a signal 448. The current $i^e_{dq}$ also is processed through a second-order low-pass filter 450 to produce a signal 452 further described below.

Block 454 provides a signal 456 having an imaginary component, in the q-axis, of the signal 448. Rotor saliency of the machine 324 causes reactance of signals measured at stator terminals of the machine 324 to vary as a function of rotor position. The imaginary component of the signal 456 captures a high-frequency impedance of the injection signal $V_{inj} \cos \omega_{inj}t$, injected into stator voltages (and vector-rotated with the stator currents at block 332) as described with reference to FIG. 4. At block 460, the signal 456 is multiplied by a signal $\sin \omega_{inj}t$, thereby producing a DC value in a signal 464. At block 468 the signal 464 is multiplied by a gain:

$$\frac{-2\omega_{inj}L_dL_q}{V_{inj}(L_d - L_q)}$$

where $\omega_{inj}$ represents the injected signal frequency, $L_d$ and $L_q$ represent inductance in the d-axis and q-axis, and $V_{inj}$ represents the injected signal voltage. The output signal 432 includes a rotor position estimate that is provided to the transition module 428.

Referring now to high-speed module 424, synchronous reference frame command voltage $V^e_{dq}$ is input, with other inputs further described below, to a summing block 472. A signal 476 output by block 472 is processed in block 480 to produce an estimated synchronous stator current signal 482. Processing via block 480 is based on a stator voltage equation, specifically, $$I = \frac{V}{Ls + R}$$

where I represents stator current, V represents stator voltage, L represents stator inductance and R represents stator resistance. A voltage error signal is determined at block 484 in accordance with $V = j\omega_e LI$ is subtracted from the summing block 472, where a value for angular velocity $\omega_e$ may be obtained from the startup/restart module 348 and/or estimated by the position/speed observer module 444. The stator current signal 482 is input to a summing block 488. As described above, the current signal 452 is output by the low-pass filter 450. The filter 450 removes the high-frequency injection signal $V_{inj} \cos \omega_{inj}t$. The filtered signal 452 is subtracted from the summing block 488 to produce a signal 490, which is input to a proportional-integral (PI) control block 494 to produce a signal 496 representing a voltage phasor value. The signal 496 is processed at block 498 to produce the signal 436, which includes a rotor position estimate that is provided to the transition module 428 as described above. The signal 496 also is fed back to summing block 472, where it is subtracted from the command voltage $V^e_{dq}$.

Figure 6:
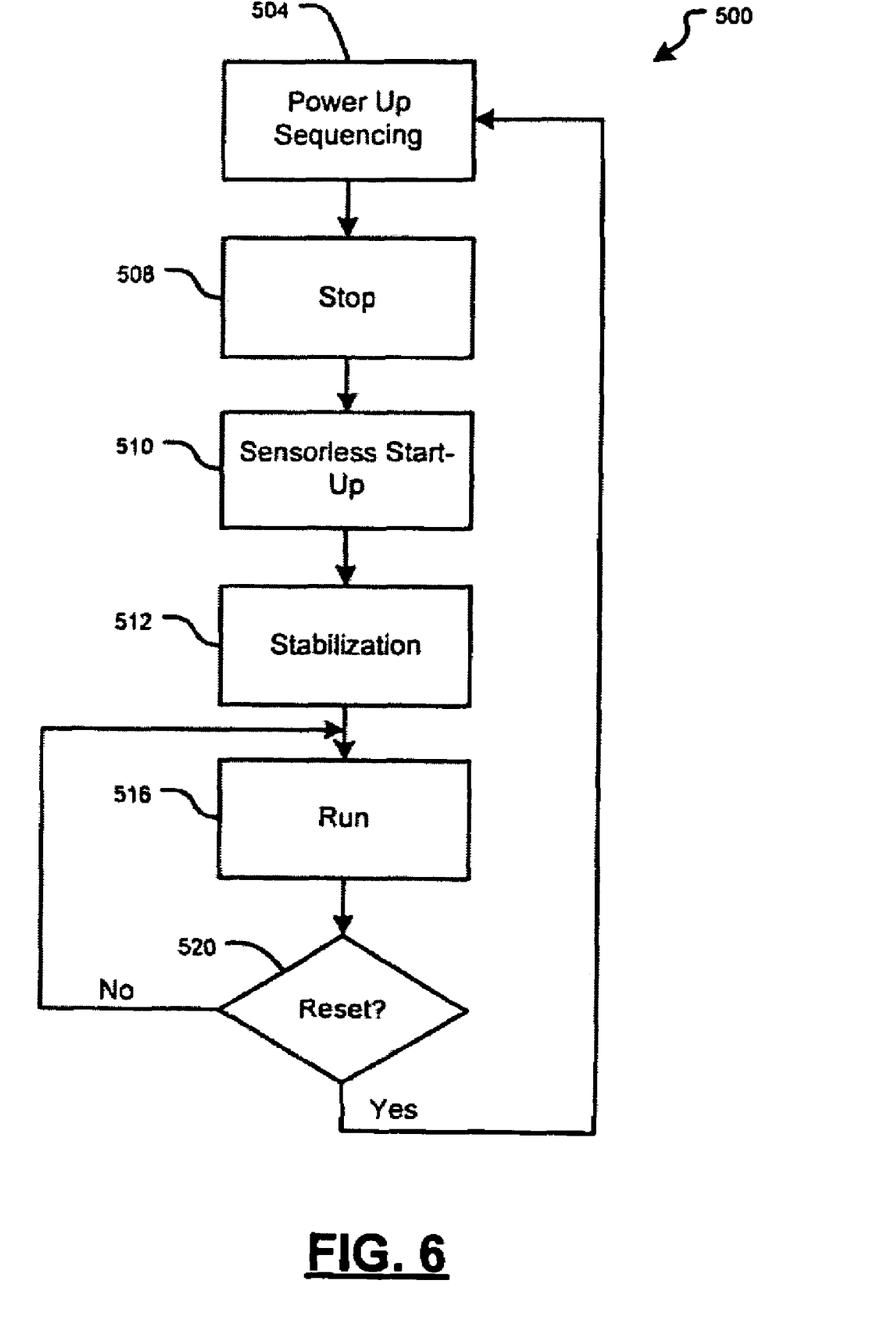
FIG. 6 is a flow diagram of a method for starting a permanent magnet machine in accordance with one embodiment of the present invention.

As described below, the startup/restart module 348 in one embodiment estimates initial rotor speed based on measured stator voltages. Based on such information, the module 348 monitors initialization of appropriate states in the control system 300. A state flow diagram of one configuration of the startup/restart module 348 is indicated generally by reference number 500 in FIG. 6. At step 504, power-up sequencing is performed, followed by a stop state or mode at step 508. At step 510, position-sensorless startup is executed. Control remains in sensorless startup mode for a predefined time interval, for example, 200 milliseconds. At step 512, stabilization is performed. Control remains in stabilization mode for a predefined time interval, for example, 100 milliseconds. At step 516, control enters a run mode and remains in run mode indefinitely. At step 520, if reset is detected, then control returns to power-up sequencing mode at step 504.

Figure 7A:
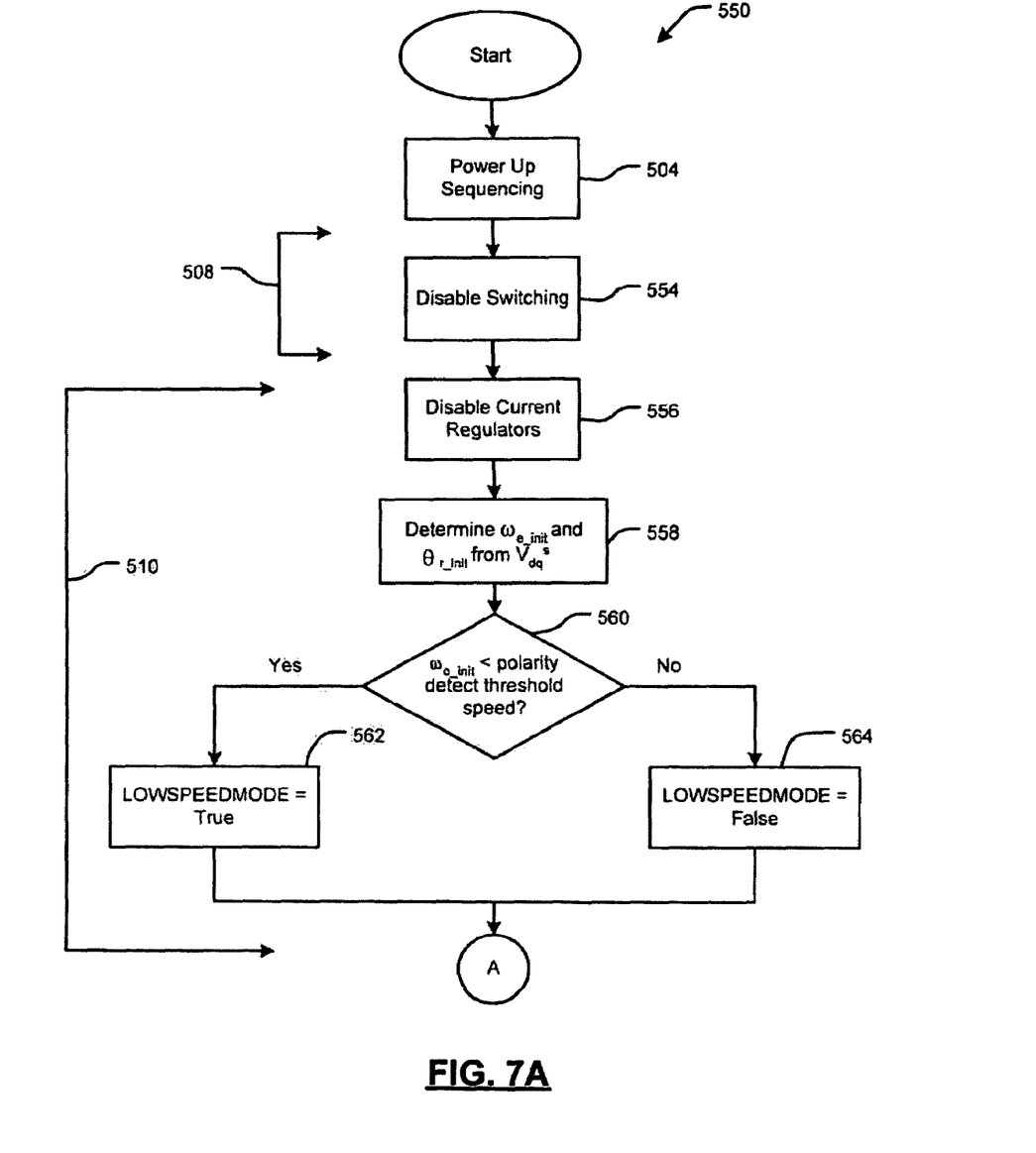
FIGS. 7A and 7B are flow diagrams of a method for starting a permanent magnet machine in accordance with one embodiment of the present invention.
Figure 7B:
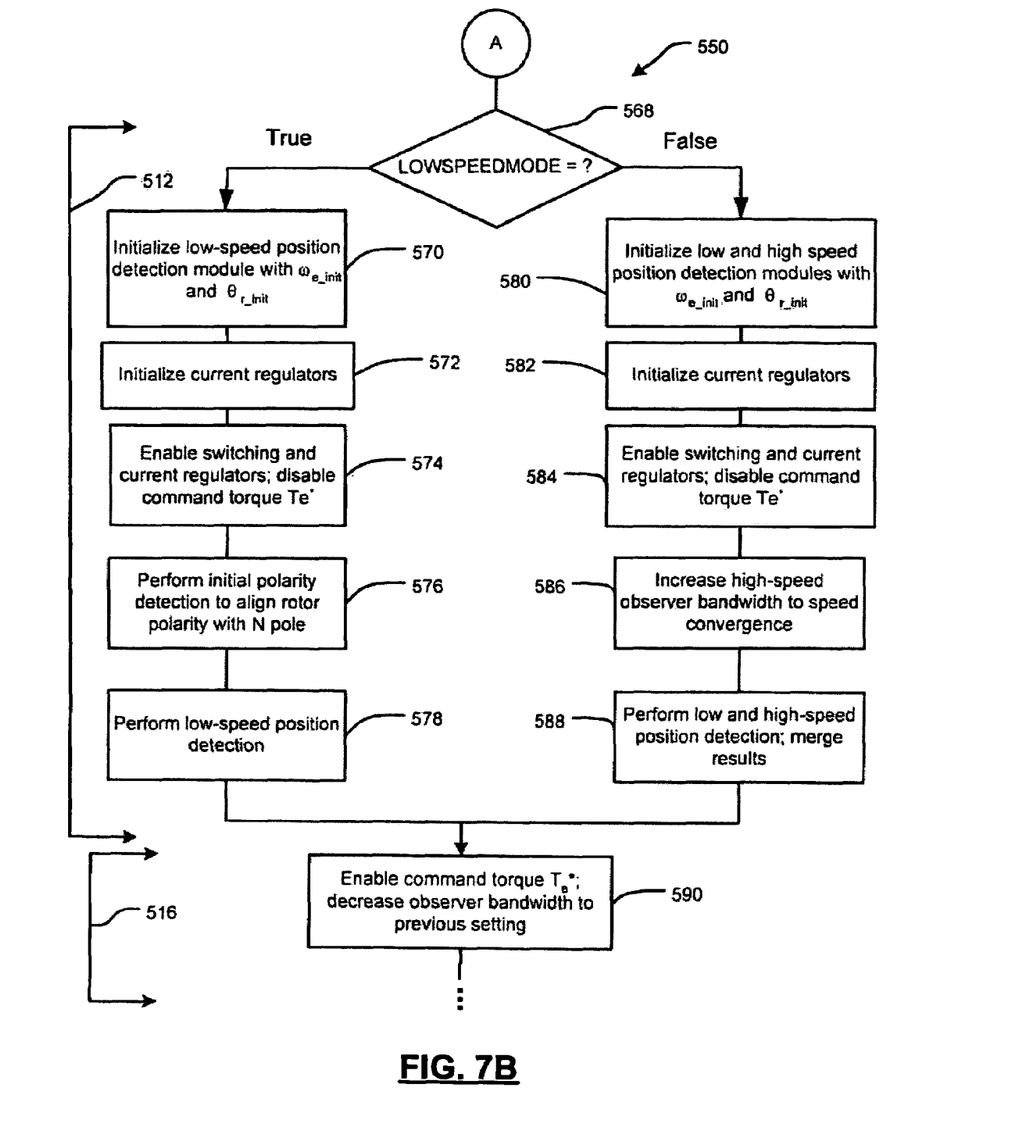

The foregoing modes are described in greater detail with reference to a flow diagram indicated generally by reference number 550 in FIGS. 7A and 7B. In stop mode 508, gate drive switching of the inverter 320 is disabled at step 554. During sensorless start-up 510, gate drive switching of the inverter 320 remains disabled. At step 556, current regulators 312 are disabled. In the present configuration, the low- and high-speed modules 420 and 424 for estimating rotor position are not executed during sensorless start-up 510. At step 558, d- and q-axis stator voltages $V_d^s$ and $V_q^s$ are measured in the stationary reference frame, and initial angular velocity $\omega_{e\_init}$ and position $\theta_{r\_init}$ of the rotor 208 are estimated based on the measured voltages as further described below. At step 560, it is determined whether the estimated initial angular velocity $\omega_{e\_init}$ is less than a predetermined polarity detection threshold speed. If yes, a flag LOWSPEEDMODE is set to "True" at step 562. If no, the flag LOWSPEEDMODE is set to "False" at step 562.

During stabilization 512, the flag LOWSPEEDMODE is tested at step 568. If LOWSPEEDMODE is "True", then a low-speed detection algorithm is initialized and performed. Specifically, at step 570 the low-speed detection module 420 is initialized with initial angular velocity $\omega_{e\_init}$ and position $\theta_{r\_init}$. At step 572 the current regulators 312 are initialized. At step 574, current regulators 312 and gate drive switching of the inverter 320 are enabled and torque commands are disabled (e.g., torque is clamped at a zero torque $T_e^*$ command.)

At step 576, initial rotor polarity is detected using a polarity detect module further described below. By the end of stabilization 512, it thus is established that rotor polarity is aligned with a north pole. At step 578, low-speed position detection is performed using the low-speed module 420.

If at step 568 LOWSPEEDMODE is "False", then both low-speed and high-speed estimation modules 420 and 424 are initialized and both low-speed and high-speed estimations are performed. Specifically, at step 580 the low-speed and high-speed estimation modules 420 and 424 are initialized with initial angular velocity $\omega_{e\_init}$ and position $\theta_{r\_init}$. It is assumed that $\theta_{r\_init}$ (obtained from voltage sensing as further described below) is correctly aligned. At step 582 the current regulators 312 are initialized. At step 584, current regulators 312 and gate drive switching of the inverter 320 are enabled and torque commands are disabled (e.g., torque is clamped at a zero torque $T_e^*$ command.)

At step 586, bandwidth of the observer 444 is increased to accelerate convergence. At step 588, low-speed position estimation is performed using the low-speed module 420 and high-speed estimation is performed using the high-speed module 424. Results of the two modules are merged as previously described with reference to FIG. 5. When control is in run mode 516, at step 590 command torque $T_e^*$ is enabled and bandwidth of the observer 444 is returned to its previous setting.

Figure 8:
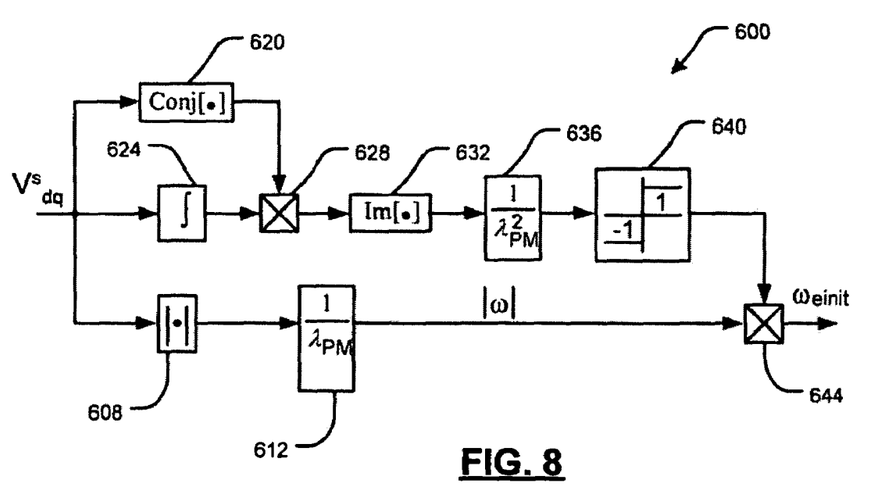
FIG. 8 is a diagram of a module for estimating initial rotor velocity and/or polarity in accordance with one embodiment.

An embodiment of a module for estimating initial rotor velocity and/or polarity is indicated generally by reference number 600 in FIG. 8. An initial rotor speed is determined from measured stator voltages (represented by complex vector $V^s_{dq}$) in accordance with:

$$|\omega| = \frac{\sqrt{V_d^{s2} + V_q^{s2}}}{\lambda_{PM}} \quad (1)$$

where $\omega$ represents rotor speed, $V_d^s$ represents the sensed voltage in a d-axis, $V_q^s$ represents the sensed voltage in a q-axis, and $\lambda_{PM}$ represents magnetic flux linkage. Specifically, the value $\sqrt{V_d^{s2}+V_q^{s2}}$ is determined at block 608 and divided by $\lambda_{PM}$ at block 612 to obtain the absolute value of rotor speed $\omega$. Polarity of $\omega$ is determined in accordance with:

$$\text{sign}(\omega) = \text{sign}\left(\frac{V_q^s \int V_d^s dt - V_d^2 \int V_q^s dt}{\lambda_{PM}^2}\right) \quad (2)$$

Specifically, a complex conjugate of $V^s_{dq}$ determined at block 620 and an integral of $V^s_{dq}$ determined at block 624 are multiplied at block 628. An imaginary component of the product is determined at block 632 and divided by $\lambda^2_{PM}$ at block 636. A sign of the result of block 636 is determined at block 640 and is represented either by 1 or by −1. At multiplier block 644 the absolute value of rotor speed $\omega$ is multiplied by 1 or by −1 to obtain a value for $\omega_{e\_init}$. Rotor position $\theta_{r\_init}$ can be obtained by integrating $\omega_{e\_e\_init}$.

The foregoing embodiments can provide smooth startup and/or restart at any speed, even under full load conditions. When the foregoing drive system enters the run state, the torque command begins to climb at an appropriate slew rate and levels off promptly. Thus the drive system can achieve a seamless running restart after a reset condition has been encountered, and drive system reliability is improved. The foregoing controller works with both position-sensor-based and position-sensorless drive systems.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and the following claims.

What is claimed is:

1. A method of starting a permanent magnet machine controlled using one or more position detection modules that detect a position of a rotor of the machine, said method comprising:
   sensing a machine stator voltage in a stationary reference frame;
   estimating an initial speed of a rotor of the machine based on said sensed voltage; and
   initializing at least one of the one or more position detection modules based on said estimated initial speed;
   said sensing, estimating and initializing performed while at least one synchronous current regulator of the machine is disabled;
   wherein said initializing comprises:
       initializing a low-speed position detection module, and if said estimated initial speed exceeds a threshold value, initializing a high-speed position detection module;
   wherein a low-speed position detection module is initialized, said method further comprising determining a polarity of an initial position of the rotor in accordance with:

$$\text{sign}(\omega) = \text{sign}\left(\frac{V_q^s \int V_d^s dt - V_d^s \int V_q^s dt}{\lambda_{PM}^2}\right)$$

where $\omega$ represents rotor speed, $V_d^s$ represents the sensed voltage in a d-axis, $V_q^s$ represents the sensed voltage in a q-axis, and $\lambda_{PM}$ represents magnetic flux linkage.

2. A method of starting a permanent magnet machine controlled using one or more position detection modules that detect a position of a rotor of the machine, said method comprising:
   sensing a machine stator voltage in a stationary reference frame;
   estimating an initial speed of a rotor of the machine based on said sensed voltage; and
   initializing at least one of the one or more position detection modules based on said estimated initial speed;
   said sensing, estimating and initializing performed while at least one synchronous current regulator of the machine is disabled;
   wherein the initial speed is estimated in accordance with:

$$|\omega| = \frac{\sqrt{V_d^{s2} + V_q^{s2}}}{\lambda_{PM}}$$

where $\omega$ represents rotor speed, $V_d^s$ represents the sensed voltage in a d-axis, $V_q^s$ represents the sensed voltage in a q-axis, and $\lambda_{PM}$ represents magnetic flux linkage.

3. A method of starting an IPM machine comprising:
providing power to the machine and sensing one or more stator voltages;
estimating an initial speed and position of a rotor of the machine using the one or more sensed voltages while disabling regulation of current to the machine;
initiating current regulation based on said estimated initial rotor speed and position while disabling a torque command to the machine;
using said estimated initial rotor speed and position to determine at least one of low-speed and high-speed estimates of rotor speed and position; and
determining a polarity of the estimated initial rotor position in accordance with $$\text{sign}(\omega) = \text{sign}\left(\frac{V_q^s \int V_d^s dt - V_d^s \int V_q^s dt}{\lambda_{PM}^2}\right)$$

where $\omega$ represents rotor speed, $V_d^s$ represents the sensed voltage in a d-axis, $V_q^s$ represents the sensed voltage in a q-axis, and $\lambda_{PM}$ represents magnetic flux linkage.

4. A method of starting an IPM machine comprising:
providing power to the machine and sensing one or more stator voltages;
estimating an initial speed and position of a rotor of the machine using the one or more sensed voltages while disabling regulation of current to the machine; and
initiating current regulation based on said estimated initial rotor speed and position while disabling a torque command to the machine;
wherein said estimating comprises estimating the initial speed in accordance with:

$$|\omega| = \frac{\sqrt{V_d^{s2} + V_q^{s2}}}{\lambda_{PM}}$$

where $\omega$ represents rotor speed, $V_d^s$ represents the sensed voltage in a d-axis, $V_q^s$ represents the sensed voltage in a q-axis, and $\lambda_{PM}$ represents magnetic flux linkage.

5. A method of starting an IPM machine comprising:
providing power to the machine and sensing one or more stator voltages;
estimating an initial speed and position of a rotor of the machine using the one or more sensed voltages while disabling regulation of current to the machine;
initiating current regulation based on said estimated initial rotor speed and position while disabling a torque command to the machine;
enabling a torque command to the machine; and
setting a bandwidth of the observer to a run-time setting; said enabling and setting performed after said initiating.

6. A drive system comprising:
an interior permanent magnet (IPM) machine having a rotor and a stator; and
a controller including one or more current regulators that regulate current commands to said machine, a gate driver that switches a signal to said stator, and one or more position detection modules that detect positioning of the rotor;
wherein said controller disables the gate drive switching, and after the disabling, performs the following:
measures d- and q-axis stator voltages in a stationary reference frame;
estimates an initial velocity of the rotor based on the measured voltages;
initializes at least one of the one or more position detection modules based on the estimated initial velocity; and
wherein said controller estimates the initial velocity in accordance with $$|\omega| = \frac{\sqrt{V_d^{s2} + V_q^{s2}}}{\lambda_{PM}}$$

where $\omega$ represents rotor speed, $V_d^s$ represents the measured voltage in a d-axis, $V_q^s$ represents the measured voltage in a q-axis, and $\lambda_{PM}$ represents magnetic flux linkage.

7. A drive system comprising:
an interior permanent magnet (IPM) machine having a rotor and a stator; and
a controller including one or more current regulators that regulate current commands to said machine, a gate driver that switches a signal to said stator, and one or more position detection modules that detect positioning of the rotor;
wherein said controller disables the gate drive switching, and after the disabling, performs the following:
measures d- and q-axis stator voltages in a stationary reference frame;
estimates an initial velocity of the rotor based on the measured voltages;
initializes at least one of the one or more position detection modules based on the estimated initial velocity; and
an observer that provides a rotor speed and position based on an estimation by the one or more position detection modules; wherein said controller increases a bandwidth of said observer to accelerate the providing after said controller initializes said position detection modules.

* * * * *